(12) United States Patent  (10) Patent No.: US 7,478,693 B1
Curtis  (45) Date of Patent: Jan. 20, 2009

(54) BIG WHEEL MOTIVE POWER SOURCE

(76) Inventor: Brent Edward Curtis, P.O. Box 57011, Pleasant Hill, IA (US) 50317

( * ) Notice: Subject to any disclaimer, the term of this patent is extended or adjusted under 35 U.S.C. 154(b) by 322 days.

(21) Appl. No.: 10/892,342

(22) Filed: Jul. 15, 2004

(51) Int. Cl.
   *B60K 6/00* (2007.10)
(52) U.S. Cl. .................. 180/165; 180/54.1; 180/65.1
(58) Field of Classification Search ............... 180/165, 180/54.1, 65.1; 74/572.1; 310/74
   See application file for complete search history.

(56) References Cited

U.S. PATENT DOCUMENTS

| | | | |
|---|---|---|---|
| 2,093,042 A | 9/1937 | Fottinger | |
| 2,935,899 A | 5/1960 | Nallinger | |
| 3,493,066 A | 2/1970 | Dooley | |
| 3,641,843 A | 2/1972 | Lemmens | |
| 3,672,244 A | 6/1972 | Nasvytis | |
| 3,732,751 A | 5/1973 | Berman et al. | |
| 3,771,311 A * | 11/1973 | Herbst | 60/709 |
| 3,870,116 A | 3/1975 | Seliber | |
| 3,886,810 A | 6/1975 | Sugiyama et al. | |
| 3,923,115 A | 12/1975 | Helling | |
| 4,131,171 A | 12/1978 | Keyes | |
| 4,171,029 A | 10/1979 | Beale | |
| 4,216,684 A * | 8/1980 | Hagin et al. | 475/74 |
| 4,233,858 A * | 11/1980 | Rowlett | 475/5 |
| 4,423,794 A * | 1/1984 | Beck | 180/165 |
| 4,473,753 A * | 9/1984 | Izumi et al. | 290/45 |
| 4,495,836 A | 1/1985 | Cohen | |
| 4,588,040 A * | 5/1986 | Albright et al. | 180/165 |
| 4,779,485 A * | 10/1988 | Dollison et al. | 74/661 |
| 4,888,949 A * | 12/1989 | Rogers | 60/434 |
| 5,124,605 A | 6/1992 | Bitterly et al. | |
| 5,215,156 A * | 6/1993 | Stulbach et al. | 180/65.3 |
| 5,244,054 A * | 9/1993 | Parry | 180/165 |
| 5,415,245 A | 5/1995 | Hammond | |
| 5,856,709 A * | 1/1999 | Ibaraki et al. | 290/45 |
| 5,931,249 A * | 8/1999 | Ellis et al. | 180/165 |
| 6,155,364 A * | 12/2000 | Nagano et al. | 180/65.2 |
| 6,488,605 B2 * | 12/2002 | van Druten et al. | 475/207 |
| 6,962,223 B2 * | 11/2005 | Berbari | 180/165 |
| 2003/0221882 A1 | 12/2003 | Long | |

FOREIGN PATENT DOCUMENTS

| | | |
|---|---|---|
| GB | 2018391 A | 10/1979 |
| WO | WO 82/01519 | 5/1982 |
| WO | WO 95/13647 | 5/1995 |

* cited by examiner

*Primary Examiner*—Christopher P Ellis
*Assistant Examiner*—Katy Meyer
(74) *Attorney, Agent, or Firm*—Jason M. Hunt; Brian J. Laurenzo

(57) ABSTRACT

A big wheel motive power source is provided. The big wheel motive power source comprises a large mass wheel capable of rotation and having a mass comprising at least one-third the weight of a vehicle in which it is located, or at least twice the weight of a conventional engine for that vehicle. A small horsepower, continuously running engine is operably connected to the large mass wheel and generates the rotation of large mass wheel. The large mass wheel may be further connected to at least one driven wheel, whereby the rotation of the large mass wheel provides a primary motive power source for a vehicle. A ratchet-type worm engaged drive, a control system, and a exhaust removal system are also disclosed for use with the present inventive device.

39 Claims, 7 Drawing Sheets

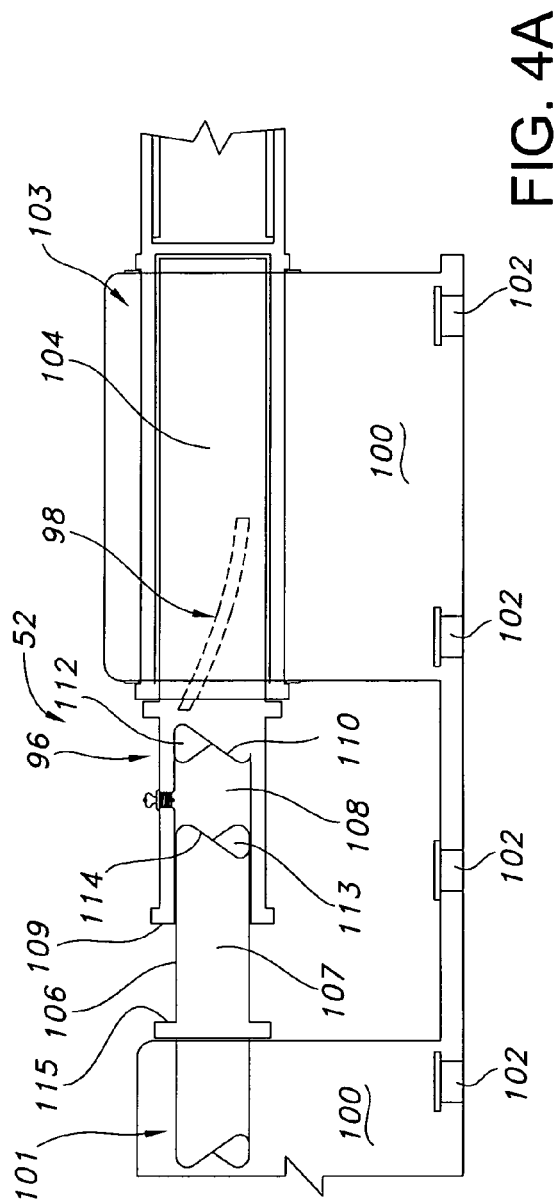
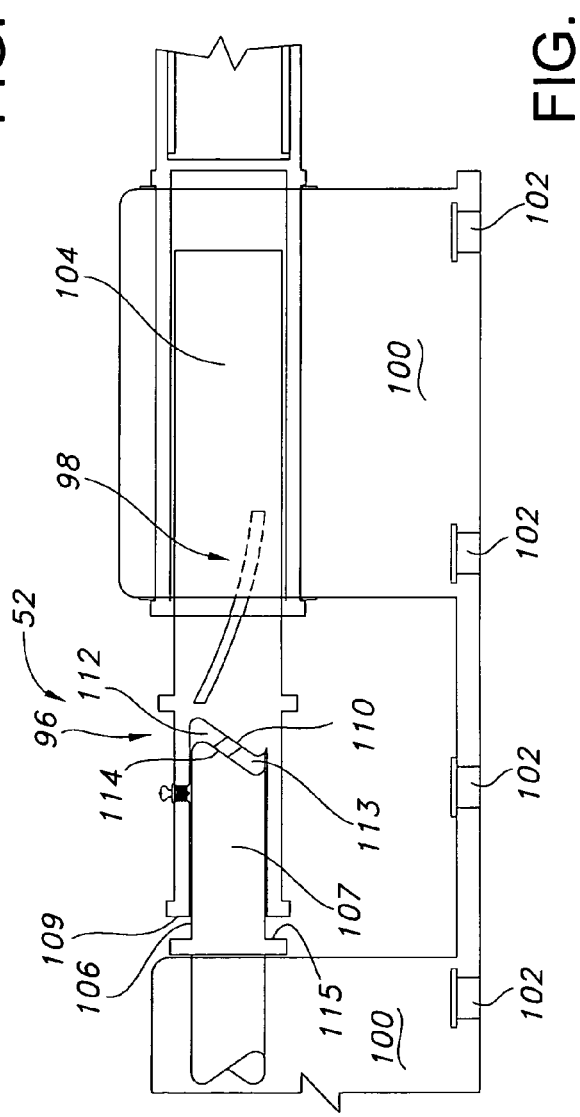
FIG. 4A
FIG. 4B

BIG WHEEL MOTIVE POWER SOURCE

FIELD OF THE INVENTION

The present invention relates to the art of power sources for vehicles, machines, and other devices and, more specifically, to a big wheel motive power source as a primary motive power source for a vehicle.

BACKGROUND

Conventional thought with respect to power systems for vehicles has been to design a lightweight vehicle for fuel efficiency. It is generally believed that a vehicle that is of lighter weight will require less power to motivate, and therefore will require less fuel input to accomplish the same power output as a heavier vehicle. Consistent with same, traditional vehicle design has been directed toward the use and/or development of light and/or small components that ultimately reduce the weight of the vehicle in which they are placed.

In connection with, and in addition to lightweight vehicles and components, various alternative power sources have been experimented with, including, for example, electric vehicles, hybrid electric vehicles, fuel cell vehicles, natural gas vehicles, neighborhood electric vehicles, electric bikes, and others. Alternative fuel sources are becoming increasingly important as government regulations and environmental consciousness become more predominant.

To this end, power sources and systems have been developed containing a flywheel which is used in combination with a motor. The flywheel is often used to generate kinetic energy for powering the vehicle.

Current flywheel automotive systems typically employ a high velocity, moderate to small mass flywheel, capable of storing and rapidly dissipating supplies of kinetic energy. Such flywheels are often coupled with a transmission adapted to permit the release of stored kinetic energy from the flywheel to the vehicle wheels. Many of these systems include a means of recharging the flywheel as it slows. The recharge is typically provided by a conventional vehicle engine.

Unfortunately, current flywheel systems incorporate a flywheel which is too light in relation to the vehicle to which it is applied. For instance, in many such systems a 2,000 lb. vehicle is provided with a flywheel of approximately 215 lbs, or roughly 1/10 the weight of the vehicle. As a result, the power generated by the flywheel will either be rapidly used, requiring almost continuous recharging, or supply very low motive power to the vehicle, resulting in minimal speed. In addition, these flywheels are commonly driven through a range of speeds from approximately 7,500 to 15,000 rpm. At such speeds, the light weight flywheel, again, will generate very little motive power. To compensate for low power, some systems have been provided with flywheels which rotate at a very high rate of speed, including in some instances up to 300,000 rpm. However, such high speed causes tremendous wear on parts and materials and, in fact, requires extremely high strength material to construct and maintain within the power source. Likewise, conventional drives have been known to fly apart at speeds approaching only 35,000 rpm. Moreover, the high speed flywheel may require a large expense of energy to bring the rotational velocity up to speed.

As indicated above, many current systems include a flywheel "recharging" engine, typically a conventional vehicle engine. In operation, if the flywheel velocity drops below a lower limit, such as below the 7,500 rpm speed noted above, the recharging engine powers on and supplies motive power to the flywheel until the flywheel reaches a designated or upper speed limit. In other words, a primary engine runs intermittently, shutting off and turning on, to control the rotation of the flywheel, allowing the flywheel to fluctuate between 7,500 rpm and 15,000 rpm. However, such devices also typically contemplate that the vehicle can be started and driven directly from the primary engine, which is a standard/conventional vehicle engine, without the assistance of the flywheel. An internal combustion engine or gas turbine is often provided as a means of recharging the flywheel system and driving the vehicle.

In addition to supplying power, kinetic energy storage systems utilizing the flywheel to store energy are also known. In such systems, the vehicle may be powered from the flywheel. Alternatively, the flywheel may be used as a generator.

As discussed, conventional sized engines are typically used to supply power to the flywheel when the flywheel falls below a minimum speed. As indicated above, it is also common for the flywheel to be bypassed to attain a direct drive between the engine and the vehicle wheels. Common in many such systems, a spinning wheel is provided in conjunction with a conventional sized engine. These systems contemplate driving a vehicle by the engine. Further, while providing a spinning wheel, the spinning wheel is typically not geared up to a level of speed to be an effective form of energy output.

Flywheels may also be used as a power supplement to enhance the overall efficiency of an engine. In such cases, the flywheel is not used as the main driving force. For example, a flywheel, which is connected to an electric motor, may be provided as a power storage means for storing mechanical rotational energy. In addition, a selectively operable clutch may be used to connect the flywheel to the driveshaft for delivering stored power to an engine. The flywheel is selectively engaged with the engine at predetermined times to provide stored mechanical energy to the engine.

In addition, it is known to provide a flywheel as an energy enhancer, such as a hybrid power system. For instance, a vehicle may be provided with a prime mover or engine, an energy storage device or flywheel, a clutch between the engine and flywheel, and a continuously variable transmission unit. Similar to other devices, the prime mover is decoupled from the flywheel and shut off to terminate fuel consumption when the flywheel reaches a predetermined level of speed. The internal combustion engine is generally the prime mover for the vehicle, while the flywheel is placed in driving connection with the transmission and the engine when the vehicle is to be driven under a heavy load. In other words, the hybrid power system is provided for assisting the prime mover and powering the vehicle. Similarly, electrically powered motor vehicles having a flywheel and a motor generator are also known. In these systems, the flywheel is used as an energy buffer to provide surge power for accelerating the vehicle and for hill climbing, as a compliment to the relatively low, steady power provided by the fuel burning power source. An electric motor can also be provided to convert the power generated from the flywheel or the power source to mechanical motive power.

In addition to single flywheel systems, other variations on flywheel systems have been experimented with. For instance, devices containing multiple, small, lightweight flywheels have been attempted. These systems often rotate the flywheels in opposite directions to cancel out the gyroscopic force generated by the rotating wheels. Likewise, a number of flywheels may be rotated while others are isolated and/or run idle in a single system. The theory in many such systems is that the use of a number of small flywheels enables the power unit to be made smaller and lighter than if a single wheel were used. Vehicle propulsion and regenerative braking arrangements, including an energy storage flywheel coupled to an automatic transmission have also been attempted. Similarly, various flywheel forms are known, such as flywheels having a mass concentrated towards the outside of the shape of same, as well as flywheels of conical, radial, spheroid, toroid, and elliptical shape, constructed from metal, epoxies, ceramics, wood or plastic.

In general, disadvantages inherent in many such designs are, among other things, without a transmission between the primary engine and the flywheel, the systems are not durable enough to last very long. Namely, if a flywheel is provided of sufficient weight to generate enough power to motivate a vehicle, it would need a transmission between the primary motor and the flywheel or it would place too much strain on either the engine or the clutch. However, if the flywheel provided is lightweight, so as to avoid the need for a transmission, it would be ineffective in generating sufficient motive power. Further, often times the flywheel is positioned to rotate about a vertical axis. In such cases, the flywheel is prone to wobble, and causes significant wear on the lower component holding or supporting same in place. Moreover, many such systems incorporate a flywheel that is not heavy enough to generate effective, efficient motive power. In fact, current flywheel systems are coupled to a conventional sized engine. The conventional engine adds significant weight and is contemplated to provide the primary motive power to the vehicle. As a result, the flywheel is provided as a power supplement of minimal weight. Moreover, the flywheel is generally not appropriately geared to the vehicle wheels at a ratio effective to convey sufficient motive power from the flywheel alone. To date, an effective, efficient system has not been available in which a large mass rotating wheel generates the primary motive power for a vehicle, machine, or device.

Accordingly, what is needed in the art is an improved motive power source for a vehicle in which a large mass wheel may be used in combination with a small motor to generate efficient and strong power for a vehicle, machine, and/or device, resulting in reduced emissions and improved fuel economy. A further need exists for such features in a vehicle. Moreover, a need exists for providing a large mass wheel approximately geared between the engine and vehicle wheels for providing optimum output from the large mass wheel, which provides the primary source of motive power to the vehicle.

SUMMARY OF THE INVENTION

The invention is embodied in a big wheel motive power source for a vehicle, machine or device.

More preferably, the big wheel motive power source comprises a wheel having a mass that is one-third the weight of a vehicle in which it is located, and/or at least twice the weight of a conventional engine for the vehicle. A small horsepower, continuously running engine is operably connected to the wheel for generating rotation of the wheel, wherein the large mass rotating wheel is the primary power source, or motive power source, for the vehicle.

Until now, conventional vehicles have been made as light as possible in order to obtain decent fuel economy. Contrary to same, and unexpectedly, the big wheel motive power source provides a system in which the heavier the wheel, the more efficient the engine. Namely, power and fuel economy are gained by weight, as more weight translates into more power and better fuel economy for a vehicle.

Accordingly, it is a primary object of the present invention to provide a power source with improved fuel economy and reduced emissions produced by the energy generated from the rotation of a large mass wheel.

Other aspects, features and details of the present invention can be more completely understood by reference to the following detailed description in conjunction with the drawings, and from the appended claims.

BRIEF DESCRIPTION OF THE DRAWINGS

FIG. 4A shows a preferred embodiment of a disengaged ratchet-type drive as used with the big wheel motive power source of the present invention.

FIG. 4B shows a preferred embodiment of the ratchet-type drive of FIG. 4A, having the drive engaged.

DETAILED DESCRIPTION OF PREFERRED EMBODIMENTS

Figure 1:
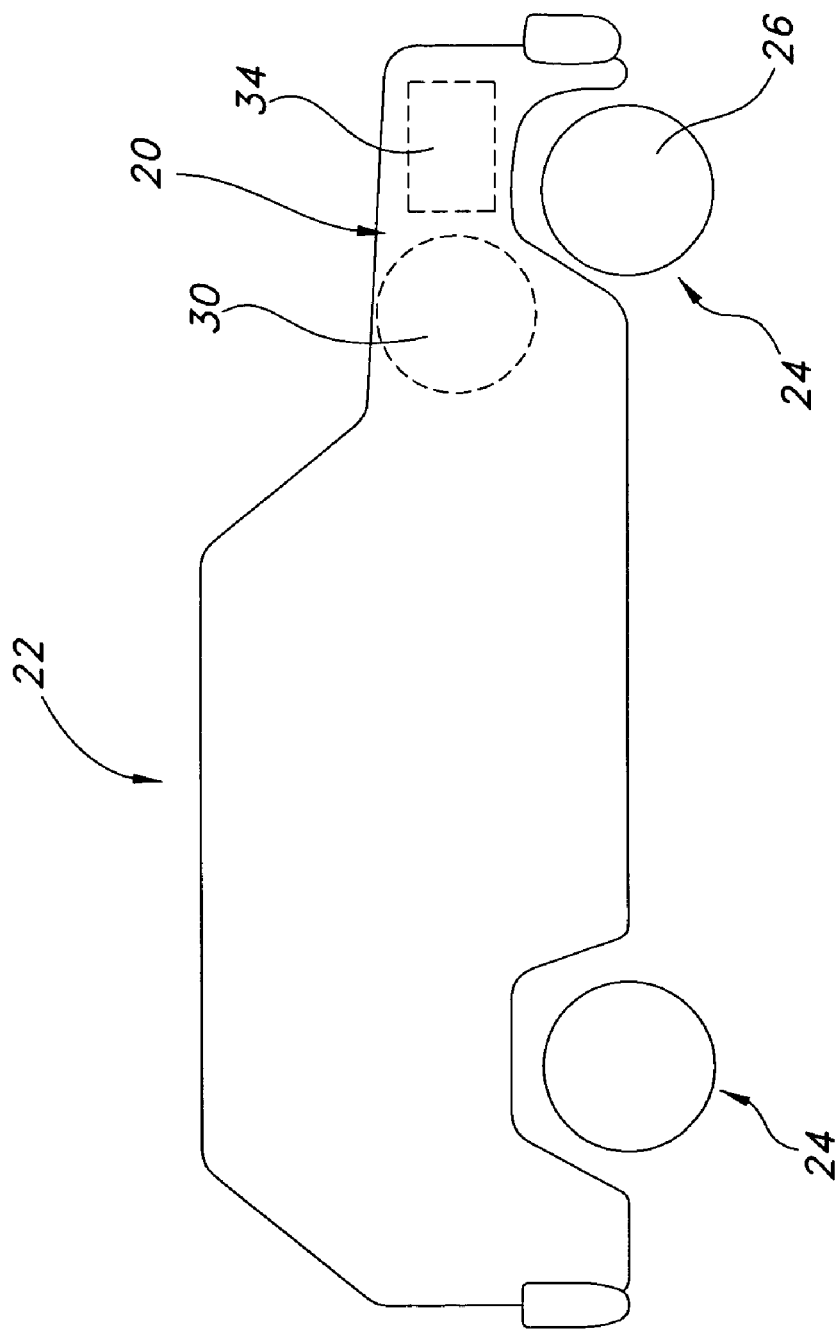
FIG. 1 is an illustration of a preferred embodiment showing the position of the big wheel motive power source in a conventional vehicle.

The present inventive big wheel motive power source is embodied in a vehicle. More specifically, the big wheel motive power source shown and described is for use with a front wheel drive vehicle.

Referring to the Figures, the big wheel motive power source 20 of the present invention is shown in connection with a vehicle 22. However, the invention is not limited thereto, as one of ordinary skill in the art would understand that the big wheel motive power source 20 may be adapted to fit any machine, vehicle, or device. Likewise, one of ordinary skill in the art would understand that the present invention may be used in combination with any vehicle employing front wheel, rear wheel, or four wheel drive without departing from the scope of the present invention.

Preferably, the big wheel motive power source 20 of the present invention comprises a power source for generating movement or motive power, in which the power source comprises a wheel capable of rotation, and having a mass of at least twice the weight of a conventional engine for that vehicle and/or one-third (⅓) the weight of the machine, vehicle, or device containing same. In addition to a large mass wheel 30, the big wheel motive power source 20 comprises a small horsepower, continuously running engine 34 operably connected to the large mass wheel 30 to generate the rotation of the wheel 30. The rotation of the large mass wheel 30 provides the primary motive power source for the vehicle 20.

As indicated, the present invention comprises a large mass, spinning wheel 30 connected to a small electric or internal-combustion engine 34 for use in a drive system. Specifically, the big wheel motive power source 20 uses conventional energy sources to motivate a heavy fast spinning wheel 30. The momentum and rotation of the wheel 30 generates energy output. The system further comprises a gearing system 43, 59 in which the small engine 34 is geared up to the large mass wheel 30 so as to increase the speed of the wheel 30 in relation to the input provided by the small engine 34. In addition, the large mass wheel 30 is geared down to the drive train 70, so that the large mass wheel 30 is spinning faster than the driven wheels 26. As will be discussed in further detail hereinbelow, the large mass wheel 30 is preferably geared up to at least three (3) times the speed of the engine 34 powering same, and then geared back down to the conventional speed to drive into a conventional drive train. Generally, this system may be provided for use in a conventional vehicle drive system. While not specifically indicated, it is further contemplated that the device may be provided in association with a generator which may assist in the storage of energy in batteries and the like, generated by the rotation of the wheel.

In detail, as can be seen in FIG. 1, a conventional vehicle 22 frame is supported on a set of vehicle wheels 24, at least one of which comprises a driven wheel 26. Preferably, as is common in a conventional vehicle 22, a pair of driven wheels 26 is provided (see FIG. 2). In the preferred embodiment, the pair of driven wheels 26 are the front wheels of the vehicle 22. Namely, the big wheel motive power source 20 is provided in a front wheel drive vehicle, although, rear wheel drive and four wheel drive are also contemplated as mentioned above. The large mass wheel 30 is preferably provided in a housing 32 mounted on the chassis 72 of the vehicle 22, behind the front axle. As a result; it distributes weight over all four wheels of same, enhancing handling. The weight of the wheel 30 positioned behind the front axle also adds stability on rain slick or ice covered roads. As described below, the driven wheels 26 may be driven through a conventional differential gear 70 by a drive shaft 66, which is driven, in turn, by the system 20 of the present invention.

Figures 2, 2A:
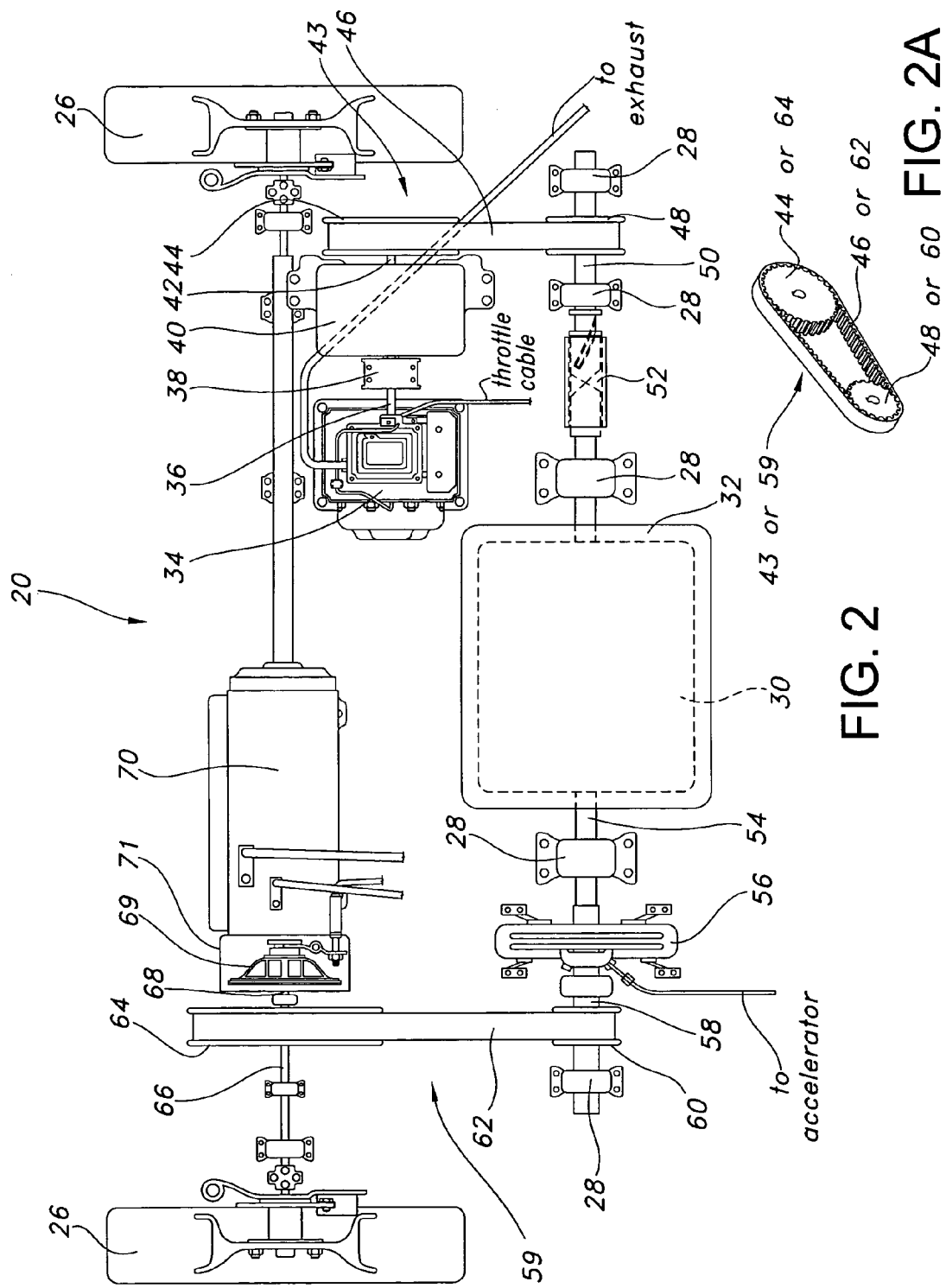
FIG. 2 shows a preferred embodiment of the big wheel motive power source of the present invention.
FIG. 2A shows a general illustration of an embodiment of the gear systems 43 and 59 between the small horsepower engine and the large mass wheel and between the large mass wheel and the driven wheels.

As can be seen in FIG. 2, the big wheel motive power source 20 of the present invention incorporates a small horsepower engine 34. The invention preferably incorporates a small motor 34, such as a gas or electric motor, geared to the big wheel 30. In a preferred embodiment, the engine 34 runs continuously when the vehicle 22 is turned on. The small motor 34 is mounted within the engine compartment of a vehicle 22 by means commonly used in the art. The small horsepower motor 34 supplies rotational energy or force to the large mass wheel 30 through a series of linkages. The continuously running engine 34, is engaged and/or disengaged from the large mass wheel 30 to maintain the rotation of the wheel. More preferably, the small horsepower engine 34 powers up (increases speed) and down (decreases speed) in response to certain preset conditions to control the speed of rotation of the large mass wheel 30. In maintaining the rotation of the large mass wheel 30, it is contemplated that the motor 34 connected thereto may increase or decrease revolutions per minute ("RPM"). A throttle may be operatively linked to the small motor 34 to control the speed of same. Preferably, a manual throttle and/or lever may be used to control the speed of the motor. However, a computer driven system is also contemplated, as discussed in further detail hereinbelow.

The big wheel motive power source 20 is preferably driven by an engine that is one-fifth (⅕) the size of a conventional engine used for driving such a vehicle. However, a smaller engine may be used. In addition to the advantages of reduced emissions, a small horsepower engine is light weight, compensating for extra weight added by the use of a large mass wheel 30. To further reduce fuel emission levels to virtually nothing, the large mass wheel 30 may be powered by an electric engine rather than an internal combustion engine. Combined with presently available long-life batteries used in electric engines, such as gel batteries and power inverters, an electric car containing a big wheel motive power source 20 may be provided with enough power to compete with currently available internal combustion vehicles.

The small horsepower motor 34 of the present invention has an output shaft 36 connected thereto for transmitting power generated by the motor. The output shaft 36 drives through a centrifugal clutch 38 into a transmission 40. Thus, the clutch serves to releasably couple the small horsepower motor 34 to the transmission 40. As is known, a centrifugal clutch 38 provides a means to disengage the engine 34 while the engine is idling or not being used. As the engine 34 speeds up, the clutch 38 engages. In detail, the centrifugal clutch 38 may comprise an outer drum (not shown) that turns freely, a center shaft 36 attached directly to the engine's crankshaft 36, and a pair of cylindrical clutch weights (not shown) attached to the center shaft 36 that are held against the shaft 36 by a spring (not shown). The center shaft 36 and weights spin as one. As is known in the art, if spinning slowly enough, the weights are held against the shaft by the spring. Once the engine spins fast enough, the centrifugal force on the weights overcomes the force applied by the spring and the weights are slung outward. The weights come in contact with the drum, and the drum starts to spin. The drum, weights, and center shaft 36 become a single spinning unit. Once the drum starts spinning, so does the shaft 36 which is also connected to the transmission 40. Advantageous to the instant invention, the centrifugal clutch 38 provides a simple means of engaging the small horsepower motor 34 with the rotation of the wheel 30 by simply increasing the power output from the small horsepower engine 34. Thus, the clutch 38 serves to releasably couple the small horsepower motor 34 to the transmission 40. While a centrifugal clutch is specifically shown and described, other means of releasably engaging the small horsepower engine 34 with the transmission 40, and ultimately the large mass wheel 30 are capable of being used with the present inventive system without departing from the overall scope of the invention, including, but not limited to, various gear systems, clutches, and the like.

As alluded to above, the output shaft 36 from the engine 34 and/or centrifugal clutch 38, comprises an input shaft for the transmission 40. The transmission 40 is preferably a 15-18 speed automatic transmission 40, and may comprise, among other things, a planetary gear set as is common in such transmissions. Likewise, the transmission 40 may further include overdrives, and preferably two (2) overdrives, in addition to other gearing ratios. Preferably, the transmission 40 is substantially, infinitely variable. While a 15-18 speed automatic transmission 40 is discussed, alternative gearing arrangements and transmissions are also contemplated.

The transmission 40 of the present invention drives a gear system 43. In particular, a first gear or pulley 44 is connected by a rotating shaft 42 to the transmission 40 (see FIG. 2). In other words, operation of the transmission 40 imparts rotation upon the first pulley 44. The first pulley or gear 44 may comprise a toothed surface or wheel, or alternatively may comprise a surface for creating friction with a corresponding surface, including but not limited to a rough or partially adhesive surface. The first pulley 44 is connected, preferably, by a toothed belt 46, or friction creating belt to a second gear or pulley 48 of a similar surface or configuration such as the toothed gear or wheel, or friction surface (see FIG. 2A). Alternative gear systems are also contemplated, such as a chain, an additional gear wheel, or multiple gear wheels, operatively and rotatably engaged between the first pulley 44 and the second pulley 48 for transmitting rotation from the first pulley 44 to the second pulley 48. Likewise, a gear train may be used to accomplish the same purpose. For use with the drive between the motor 34 and the large mass wheel 30, or the large mass wheel 30 and the drive train 70 (discussed in further detail below), wide belts having wide teeth are preferred for engaging same. However, wide belts absent teeth, and narrow belts may also be used. Further, belt tensioners may be used to accommodate variations in distance between the respective components and to accommodate common wear and tear as the belts 46, 62 become worn. In a preferred embodiment, the drive between the first pulley 44 and the second pulley 48 is geared up in a ratio of 4:1. As a result, the small horsepower engine is able to impart significantly increased rotational force on the large mass wheel 30.

From the second pulley 48, an output shaft 50 drives the rotation of the large mass wheel 30 (FIG. 2). More specifically, the output shaft 50 serves as the input shaft extending into the casing or housing 32 containing the large mass wheel 30. Furthermore, the output shaft 50 may fasten to, or run through the central axis of the large mass wheel 30. In a preferred embodiment, between the second pulley 48 and the large mass wheel 30 on the output shaft 50, a ratchet drive 52, and more preferably, a worm engaged ratchet-type drive (to be discussed in further detail hereinbelow), is provided to engage and disengage the shaft 50 with the large mass wheel 30.

As can be seen in FIG. 2, a number of low friction bearings 28, such as oil bath bearings, may be used to permit the smooth rotation of the components on the various drive shafts 36, 42, 50, 54, 58, 66 and so forth. For example, the large mass wheel 30 is mounted for high velocity rotation within a housing 32 by way of anti-friction bearings 28 on each side of the housing 32 and/or wheel 30 (see also FIG. 3). The oil bath bearings 28 are located on each side of the large mass wheel 30 allowing for the smooth rotation of same. Likewise, the drive shaft 58 has a number of oil bath bearings providing for the smooth rotation of the drive shaft 58. Namely, an oil bath bearing is provided on each side of a major component of the drive system, such as a pulley 60 on the drive shaft 58.

As indicated above, the output shaft 50 drives into the large mass wheel 30. In a preferred embodiment, a single large mass wheel 30 is provided. While the energy output of the big wheel motive power source 20 is generated primarily from the momentum of a single, heavy, fast spinning wheel, it is contemplated that more than one wheel may be used without departing from the scope of the present invention. In fact, no limit exists to the weight or number of wheels that can be used, apart from the logistical constraints of providing same in a machine, vehicle, or device. Generally, the heavier the wheel(s), the more rotational momentum will be generated, resulting in more power and better fuel economy for the vehicle 22. An effective, efficient system is provided in which a large mass wheel 30 is applied in weighted relation to the vehicle and/or engine it is driving. To accomplish same, the large mass wheel 30 is preferably at least one-third (⅓) the gross weight of the vehicle 22. Alternatively, the wheel 30 comprises a weight of at least twice the weight of a conventional engine or engines that would normally drive that vehicle. In a preferred embodiment, in a 2,000 lb to 3,000 lb vehicle, such as a common sedan, it is contemplated that the large mass wheel comprises a weight of approximately 900 lbs or more (approximately ⅓ the weight of the vehicle). As a result of this weight relation and the gearing up to, and down from the large mass wheel 30 described herein, the estimated power output of the system 20 comprises at least five (5) times the power output of the engine 34, and, in fact, could be at least three (3) times such a ratio. In effect, if the engine 34 comprises one-fifth (⅕) of the horsepower of an engine normally provided to drive a particular vehicle, that vehicle employing the drive system of the big wheel motive power source 20 would have at least comparable power to the same vehicle powered by a conventional engine.

As an additional, illustrative, non-limiting example of the weight relation between the large mass wheel 30, the vehicle engine 34, and the vehicle weight, a large mass wheel 30 is provided which is at least one-third (⅓) the weight of the vehicle 22. A vehicle, such as a conventional mid-sized sport utility vehicle ("SUV"), has a curb weight of approximately 4,500 lbs. For such a vehicle, the weight of the large mass wheel 30 applied to same would equal at least 1,500 lbs. Consistent with a preferred embodiment of the present invention, the vehicle engine would be reduced in size to nearly ⅕ the size of the conventional engine for the vehicle. Thus, for an SUV having a V-8 engine producing 239 horsepower, the big wheel motive power source would only require an engine producing approximately 48 horsepower to generate the same power output. Significant advantages are gained from such a system, as the engine power requirements and input are limited to producing 48 horsepower, while the primary power output being generated for motivation of the vehicle, of equivalent or greater horsepower, is generated by the rotational energy of the wheel. This results in a significant increase in gas mileage in comparison to a V-8 engine which has an average gas mileage in a conventional SUV of between 15 and 19 miles per gallon.

Alternatively, as indicated above, the large mass wheel 30 may comprise at least twice the weight of a conventional vehicle engine. As an alternative, non-limiting example, industrial machinery, such as a 30 ton digger or excavator may have a 250 horsepower engine weighing approximately 2,000 lbs. It has a counterweight weighing 14,000 lbs. To obtain the equivalent power output using the big wheel motive power source 20, the large mass wheel 30 would comprise a weight of approximately 4,000 lbs. (twice the weight of the conventional engine). In order to compensate for the added weight, a counterweight of a lesser weight would be required in the machine. Consistent with same, to increase the power that can be generated by the large mass wheel 30 and decrease the size of the counterweight, heavier mass wheel(s) 30 can be provided. An added advantage of the provision of a big wheel motive power source 20 in industrial machinery, is that even when the engine 34 is idling, the large mass wheel 30 is still spinning at a sufficient speed to permit the operation of the hydraulic pumps at full capacity.

As can be seen, these ratios can be used and/or applied in any size or type of vehicle or engine to obtain the appropriate size and weight wheel 30 for effective energy output. In a preferred embodiment, the one-third (⅓) ratio, of wheel 30 to vehicle 22, is provided for a vehicle that can reach speeds over 60 mph, and most preferably vehicles powered over land. The alternative weight ratio described, namely, twice the weight of a conventional engine, is most effective in machinery and other vehicles not reaching significant speeds, as well as boats and ships. However, either weight limit may be applied in any vehicle, machine, or device for effective energy output without departing from the overall scope of the present invention.

Preferably, the large mass wheel 30 is a cylindrical, circular, or ring shaped wheel, the size of which may vary depending on the material used. In a preferred embodiment, the large mass wheel 30 also comprises a minimum of 18 to 24 inches in diameter to allow sufficient rotational staying power at the outer circumference in relation to the weight of the large mass wheel 30. Further, the mass/weight is distributed evenly throughout the wheel 30, although, it is contemplated that the mass/weight could be concentrated in certain locations, such as the outer circumference of the wheel. Likewise, it is contemplated that any size and shape wheel capable of providing the necessary rotational energy would be acceptable for purposes of the present invention. The large mass wheel 30 of the preferred embodiment rotates on a horizontal axis, so that wobble and the requirement for significant support below the wheel may be avoided. Furthermore, rotation of the wheel 30 is provided in a manner that throws the torque or centrifugal force toward the rear of the vehicle 22.

Unique to the instant invention, the weight of the wheel 30 may be increased without having to increase the size of the engine 34 driving it. In fact, by varying the material making up the large mass wheel 30, the weight of the large mass wheel 30 can be at least doubled without increasing the size of the wheel 30. Preferably, this is accomplished through using different materials in the manufacture of the wheel 30. For example, while steel may be used for the wheel 30 composition, titanium could be used for a heavier, yet smaller wheel 30. Titanium has significant advantages, as it will permit an increase in weight at least two or three times the weight of other substances, without increasing the size of the wheel 30. However, it is contemplated that any material suitable for being formed into an object containing considerable weight or material containing considerable weight would be acceptable for purposes of the present invention.

Figure 3A:
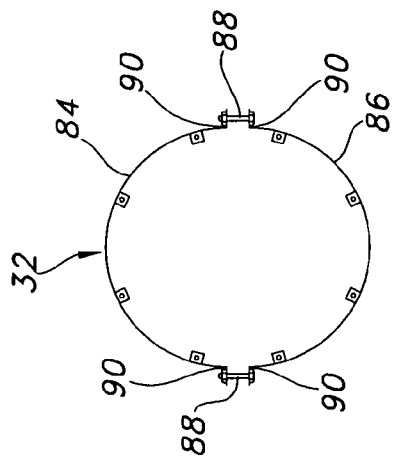
FIG. 3A shows an end view of the outer housing of FIG. 3.
Figure 3B:
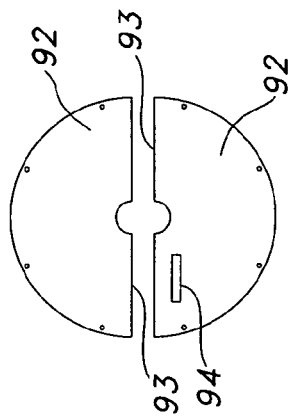
FIG. 3B shows an embodiment of the housing end covers of FIG. 3.
Figure 3:
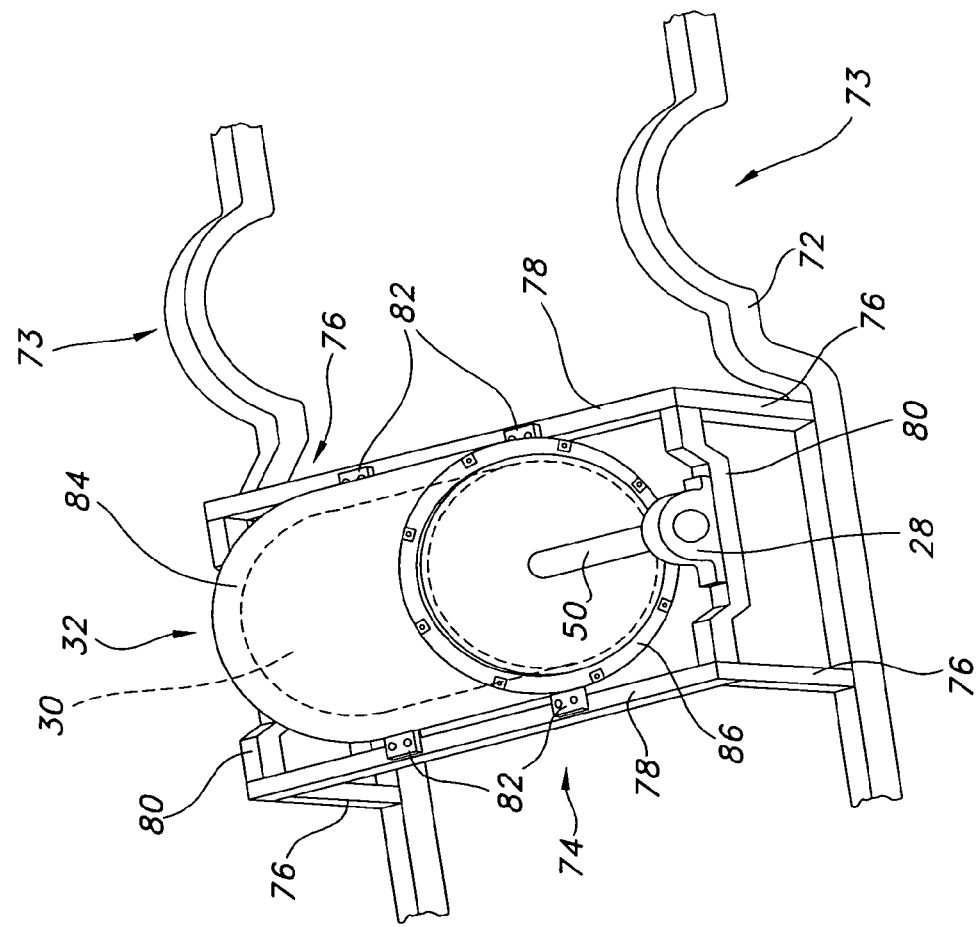
FIG. 3 shows a cut-away view of the position and support of the large mass wheel and associated housing behind the forward end of a vehicle in an embodiment of the present invention.

As discussed in further detail herein, the big wheel motive power source 20, and more preferably the large mass wheel 30, is located behind the front axle of a vehicle 22 (see FIG. 3). Particularly, when a heavy wheel 30 is provided, the weight of the wheel 30 is better supported behind the axle between the front wheels 26. In such a location, as discussed above, the weight of the wheel 30 is distributed through the four wheels 24 of the vehicle 22. Further, as can be seen, in a preferred embodiment the large mass wheel 30 is positioned on a support structure behind the front wheels or wheel wells 73 of the vehicle 22. Namely, a frame 74 comprises upwardly extending legs 76 connected at the top thereof by cross bars 78. The support structure has a support bar 80 on each side, running substantially parallel to the frame 74 of the vehicle 22. The support bars 80 further connect cross bars 78 to provide a substantially rectangular support structure. The housing 32 in which the large mass wheel 30 is contained is mountably supported on each cross bar 78 by mounting means 82 commonly available in the art sufficient to support the weight of the housing 32. Likewise, the bearing 28 and drive shaft(s) 50, 54 connected to the large mass wheel 30 are supported by the support bars 80 near the center thereof. Referring to FIG. 3, only a single bearing 28 and shaft 50 are shown. However, the opposing side of the wheel 30 and housing 32, including a bearing 28, shaft 54, housing components, and other features, may comprise an identical arrangement and support. The support and connection on the support bars 80 is sufficient in strength to support the weight of the large mass wheel 30, and may include any necessary support structure or composition known in the art for accomplishing same.

The large mass wheel 30 is preferably located inside the housing 32 (see FIGS. 2 and 3). The housing 32 is preferably a guard of sufficient strength, such as steel or like material, to prevent the large mass wheel 30 from "steam rolling" in the event of a crash or sudden stop. In detail, the housing 32 comprises an upper housing 84 and a lower housing 86, each having a semicircular shaped housing element (see FIG. 3A). The upper housing 84 is removably attached to the lower housing 86 by bolts 88 extending from flared out ends 90 of the upper 84 and lower 86 housing members. In addition to upper 84 and lower 86 housing members, each end of the housing 32 also includes a housing cover 92 (see FIG. 3B). Preferably, a pair of housing covers 92 are provided on each end, and are attached by any means common in the art, such as a screw-type connection, friction fit, tongue and groove, male/female connection, and the like. Each half of the housing cover 92 comprises a semicircular plate having a semicircular cut-out in the center of the straight wall section 93 in the housing cover 92 for positioning the cover 92 around a drive shaft. In addition, at least one housing cover 92, or any housing member, may include a vent 94 for permitting the exhaustion of air from the chamber 32, and/or provide for the inlet of cooling air when needed. Preferably, the vent 94 directs air exhausted from the housing chamber 32 downward away from the vehicle 22. It is noted, FIG. 3 demonstrates the position and support of the large mass wheel 30 on the vehicle frame 74. For purposes of clarity, elements such as the pulleys, belts, engine, cross bars supporting such components, bearings, drives, and so forth, many of which are demonstrated in other Figures, are not shown, although such features would be contained within the frame of the vehicle preferably near the positions shown in FIG. 2.

Referring, again, to FIG. 2, in the preferred embodiment a slip clutch 56 is provided in operable connection with the large mass wheel 30 through shaft 54 extending from the large mass wheel 30 out of the big wheel housing 32. An accelerator controls the engagement of the slip clutch 56 with the wheel 30. By pushing an accelerator pedal down, the slip clutch 56 is slowly and gradually engaged, which, in turn, transmits power to the driven wheels 26 from the spinning, large mass wheel 30. Thus, the position of the accelerator pedal determines the speed of the vehicle 22 relative to the speed of the large mass wheel 30. In other words, the clutch 56 releasably couples the large mass wheel 30 to the driven wheels 26. While a slip clutch 56 is specifically disclosed, it is contemplated a continuously variable transmission, alternative type clutch, or other device may be used in place of the slip clutch 56 to transmit power from the large mass wheel 30 to the driven wheels 26.

A drive shaft 58 is subsequently driven from the slip clutch 56 into a gear system 59. In particular, the shaft 58 drives into a into a third pulley 60 which is connected by rotating shaft 58 to the large mass wheel 30. In other words, rotation of the large mass wheel 30 imparts rotation upon the third pulley 60 through the shaft 58. Similar to the gear system 43 described above, and as shown in FIG. 2A, the third pulley 60 may comprise a toothed gear surface or wheel, or alternatively may comprise a surface for creating friction with a corresponding surface as described above. The third pulley 60, is connected to a fourth pulley or gear 64 by a toothed belt 62, or friction creating belt. The fourth pulley 64 comprises a surface comparable to the third pulley 60. Of course, similar to the first gear system 43, alternative gear arrangements may be used to impart or transmit rotation between the third pulley 60 and the fourth pulley 64, such as, but not limited to, a chain, multiple gear wheels, a gear train, and the like. The output from the third pulley 60 is transmitted to a fourth pulley 64 located on the input drive shaft 68 through the belt 62 as discussed above. Preferably, the drive between the third pulley 60 to the fourth pulley 64 is reduced by a ratio of 1:5. As a result, the rotational speed transmitted from the large mass wheel 30 to the driven wheels 26 is reduced while the force is increased, enhancing the energy provided by the large mass, fast spinning wheel 30. As can be seen in FIG. 2, the fourth pulley 64 is driven into the gearbox and differential 70. The output shaft 66 will supply motive power to the driven wheels 26. The gearbox, clutch 69, and bell housing 71 for the front wheel drive system are standard components, and in FIG. 2 are provided above the differential drive enclosed in housing 70 with the gearbox. The output shaft 66 to the driven wheels 26 is provided below the input drive shaft 64, and preferably a distance sufficient for clearance from the pulley 64. Thus, for reference, the view provided in FIG. 2 shows the drive shaft 68 extending between the pulley 64 and gearbox, which combination is elevated from the drive shaft 66 linking the differential to the driven wheels 26. The gearbox and differential 70, in the front wheel drive vehicle, is located adjacent to and operatively linked to the pulley 64 which is driven by the belt 62. The gearbox and differential 70 are operatively linked to the driven wheels 26 of the vehicle, and have the common structure and function of a front wheel drive vehicle, and will therefore not be further discussed herein.

For ease of reference and understanding, other features, such as an alternator, which may run off a separate belt from one or more drive pulleys, and other devices such as electronics and a battery, are not specifically discussed. However, one of ordinary skill in the art would understand that any of these conventional features can be provided in association with the present system in their common linkages or adapted to fit with the big wheel motive power source 20 of the present invention without departing from the overall scope of the invention.

As indicated, the motor 34, through the various components described above, generates the revolution of the heavy mass, fast spinning wheel 30. Preferably, the rotation of the heavy wheel is between 12,000 and 20,000 rpm, and most preferably is maintained at approximately 16,000 rpm. For heavier weight wheels, a longer start up period may be necessary in order to bring the wheel up to this speed for efficiently driving the vehicle. However, once the heavy, fast spinning wheel 30 has reached its optimum speed, it basically motivates itself. Thus, for example it is contemplated that the startup period for the big wheel motive power source 20 may be 5-15 minutes to bring the rotation of the large mass wheel 30 up to speed. Ultimately, the length of time necessary to bring the rotation of the wheel up to a particular rotational velocity will depend on the size of the driving engine 34 in relation to the weight of the wheel 30. For lengthy starting periods, a remote start system may be used to prepare the vehicle for use (discussed in more detail below).

The operation of the big wheel motive power source 20 will be briefly described below. To power up the big wheel motive power source 20, a user starts the engine 34. The small horsepower engine 34 idles until a throttle increases the speed of the engine 34. The speed of the small horsepower engine 34 is controlled by hand control or throttle accessible by a user, or alternatively by computer control of the throttle. Preferably, the speed of the small horsepower engine 34 is increased to approximately 4,000 rpm. The increase in speed of the engine causes the centrifugal clutch 38 to engage and power is transmitted through the transmission 40, gear system 43, and ratchet drive 52 to the large mass wheel 30, causing the rotation of the large mass wheel 30. The rotation of the large mass wheel 30 may be affected by the gear ratio between the small horsepower engine 34 and the large mass wheel 30. The invention contemplates gearing up to the large mass wheel 30 from the small horsepower engine 34 to at least three times the speed of the engine 34. The large mass wheel 30 is then ultimately geared back down to an acceptable speed to drive into a conventional drive train.

As the rotation of the large mass wheel 30 increases, less power output is required from the small horsepower engine 34 as a certain amount of inertia will be present in the already spinning wheel 30. Once the big wheel 30 is up to speed, its own weight and momentum comprise the largest driving force keeping same at or near speed. Therefore, power output directly from the small horsepower engine 34 to the large mass wheel 30 continues until the rotational speed of the large mass wheel 30 reaches a preset limit, such as 16,000 rpm. At this point, the speed of the small horsepower engine 34 is reduced to a slower speed, such as 2,000 rpm. In the preferred embodiment, when the wheel 30 speed reaches 10,000 to 15,000 rpm, the throttle will be reduced to 2,000 rpm on the primary drive motor 34. The small horsepower engine 34 continues at the reduced speed until power is required to regain the rotational velocity of the large mass wheel 30, at which point the small horsepower engine 34 accelerates to a higher speed. As discussed hereinabove, the momentum of the heavy mass, spinning wheel 30 maintains the rotation of the large mass wheel 30 for a significant period of time. As the rotational speed drops below a preset limit, the power from the small horsepower motor 34 is reapplied in the manner indicated above.

Release of energy from the large mass wheel 30 is by way of a shaft 54 extending out of the wheel 30, out of the housing 32, through a clutch 56, a gear system 59 and ultimately to the driven wheels 26. Thus, the speed of the vehicle 22 is dependent upon the rotational speed of the large mass wheel 30. Specifically, when the slip clutch 56 is engaged, kinetic energy stored in the large mass rotating wheel 30 is released to an output shaft 58 via the slip clutch 56 and is transferred to the main drive, namely, the front wheel drive system, including the associated gearbox and differential 70. The clutch 56, when engaged, transmits rotary motion from the large mass wheel 30 to the driven wheels 26. Conversely, when the clutch is disengaged, no power is transmitted to the driven wheels 26 from the large mass wheel 30. Namely, when the clutch is disengaged, the wheel continues to rotate, but does not transmit energy to the main drive. As indicated previously, the output shaft 54 may be a continuation of shaft 50 extending through the center of the large mass wheel 30, or may comprise a separate shaft attached to the large mass wheel 30, or the shaft and wheel may be one component.

The release of energy from the rotating large mass wheel 30 is under the control of the operator, such that the system may be adjusted from zero transmission of power to full power from the large mass wheel 30. Acceleration of the vehicle 22 is controlled separate from the speed of the motor 34 rotating the large mass wheel 30. As two controls are provided for maintaining the power output of the big wheel motive power source 20, preferably, the vehicle 22 will include two revolution counters on the dashboard, one communicating the rotational speed of the small engine 34, the other communicating the rotational speed of the large mass wheel 30. In the preferred embodiment, the slip clutch 56 is connected through a linkage to a vehicle accelerator pedal (not shown), so that the clutch 56 is automatically engaged whenever the accelerator pedal is depressed. In particular, as the pressure on the accelerator increases, the clutch 56 is increasingly engaged until full power is transmitted through a fully engaged clutch 56. Therefore, as the accelerator is depressed the vehicle 22 will move, increasing in speed with the increase in pressure on the accelerator. As rotational energy is transmitted to the driven wheels 26, the large mass wheel 30 will slowly lose energy and therefore require the reapplication of power from the small horsepower engine 34 as described above.

As shown in FIG. 2, and described above, the transmission of power for rotation of the large mass wheel may occur through a ratchet drive. In a preferred embodiment, the ratchet drive comprises a worm engaged drive 52 that will permit the drive to slidably engage at high speed with the addition of power, and disengage with the removal of power. With a heavy mass wheel rotating at high speed, and/or a heavy load vehicle 22, a worm engaged, ratchet-type drive provides several advantages to alleviate potential wear and tear on parts and materials of the vehicle 22 and the power source. Namely, the drive engages only when necessary to motivate the large mass wheel 30. In fact, while specifically discussed for use with the big wheel motive power source 20, the ratchet-type, worm engaged drive may be used in any conventional power source and/or vehicle to accomplish the same benefits. In particular, this drive 52 can be engaged at high speed without damaging the components of the drive system. It is also fully self-contained, so that it will not fall apart under high speed, heavy load situations. The worm engaged drive engages the drive system when needed, and permits "free-wheel" rotation of the system when not needed. The drive uses a soft impact interlocking drive 96 and a worm engaging initiator 98 to engage and disengage the vehicle engine and the power source, or motive power source. Ultimately, a worm engaged, ratchet-type drive 52 may be provided in high speed, heavy load, and industrial applications, as well as car axles, small vehicles, four wheel drive vehicles, go karts and the like.

Referring to FIG. 2, in the preferred embodiment the ratchet-type, worm engaged drive 52 is located between the engine 34 and the drive train 70. More specifically, in the preferred embodiment the ratchet-type, worm engaged drive 52 is positioned between the small horsepower engine 34 and the large mass wheel 30 adjacent the wheel 30 and the gear system 43. As a result, the drive shaft 50 runs through the ratchet-type drive 52 into the large mass wheel 30.

As can be seen in FIGS. 4A and 4B, bearing blocks 100 support the left and right hand engaging members 101, 104 of the ratchet-type, worm engaged drive 52. The bearing blocks 100 and general support system for the drive 52 may be fastened or bolted through connection means 102 to a supporting structure of the vehicle 22 or engine mount by any means known in the art. The left 101 and right 104 hand engaging members comprise a drive shaft 50 having a drive in member 103 and a drive out member 106. The drive in member 103 comprises a cylindrical drive shaft rotatable within the bearing block 100 and having a receiving section 108 on an end thereof defined by a hollowed out portion of said drive shaft extending between the end 109 of the drive in member 103 inward toward a first angled wall section 110 having a first partially soft impact member 112. Drive in member 103 is an input drive of the ratchet-drive system 52. The partially soft impact member 112 is attached to the angled wall section 110 by any means known in the art for securing same in position. The first partially soft impact member 112 preferably comprises very high tensile steel. However, any composition known in the art for accomplishing the same purpose would be acceptable for purposes of the present invention. The impact is "soft" because the wheel 30, left 101, and right hand 104 engaging members are already spinning. Namely, while the impact members 112 and 113 are comprised of hard steel, the impact of same is soft because two components, spinning in the same direction, are being brought together. The impact results from the engagement of the interlocking drive components 104 and 106. The drive in member 103, or initiator, spins inside the bearing block 100. When the drive is applied through the initiator 103, the worm 98 throws engaging member 104 outwards to engage with output drive member ("the drive out") 106. As these two surfaces engage, the engagement of face surface 109 with face surface 115 occurs.

The drive in member 104 further includes a worm member 98. More preferably, a plurality of worm members 98 are provided. In the preferred embodiment three (3) worm members 98 are provided for the active engagement of the drive in 103 and drive out 106 members. However, any number of worm members 98 may be used without departing from the overall scope of the present invention. The worm 98 is a raised, worm shaped spline that, when the power is applied, throws the engaging member 104 toward the drive out member 106, engaging the drive. Conversely, when the power stops, the worm 98 sucks the engaging member 104 back away from the drive out member 106 (FIG. 4A).

The drive out member 106 comprises at least a partially narrowed drive shaft 107 which may be matingly received within the hollowed portion 108 of the drive in member 104. The drive out member 106 further comprises an oppositely angled end wall section 114 for engaging the angled wall section 110 of the drive in member 104.

In operation, when the power from the vehicle engine 34 is transmitted to the drive shaft 50, the worm 98 throws an engaging member 104 towards the drive out member 106, impacting the first impact member 112 with the oppositely angled wall section 114, and the second impact member 113 with the angled wall section 110 on the drive in member 104. This engagement causes the rotation of the drive in 103 to rotate the drive out member 106, therefore completing the shaft 50 and rotating the large mass wheel 30. Conversely, when the power stops, the worm 98 sucks the engaging member 104 back and away from the drive out member 106, disengaging the drive. Preferably, the ratchet-drive 52 will engage the largest percentage of the time under operational conditions, namely, when the drive in and drive out members are both spinning. As a result, the impact is "soft" (as described hereinabove) under operational or high speed conditions. Conversely, it is possible at the time of start-up of the power source 20 that the ratchet-drive 52 will not be engaged. The drive in will be spinning while the drive out is not. As the engagement between drive members under these conditions does not occur under speed, the impact between drive members will also be soft.

As discussed above, not only is the worm engaged, ratchet-type drive for use in the presently disclosed big-wheel motive power source 20, but other devices and systems may incorporate and benefit from same. For example, the worm engaged, ratchet-type drive may be used in industrial applications, airplanes, motor vehicle axles, small vehicles, as well as four wheel drive vehicles. Uniquely, apart from the specific limitations of materials chosen for the composition of the device, there is no limit to the size or speed that can be applied to the ratchet-type, worm engaged drive.

As mentioned hereinabove, and shown in FIG. 5, a control system 116 for powering and operating the device is also contemplated. In order to pre-start the big wheel motive power source 20, particularly in light of the potential lead time that may be necessary to generate sufficient rotation of the large mass wheel 30, a remote activation system is also contemplated.

Preferably, a telecommunication device, such as a telephone or mobile phone 118, may be used to start the motive power source from a remote location. Likewise, a personal digital assistant (PDA) with remote operation capabilities may also be used for remote activation of the power source. Alternatively, the remote system may comprise a key-start system, as is commonly available today. A telecommunication device 118 has further advantages over a key chain-start system, as common key chain-start systems require the user to be in a location near the vehicle 22 to in fact start same. The telecommunication device 118, on the other hand, will permit the user to start the machine, vehicle, or device from any location that the user has access to a phone, as a receiver is placed on or near the vehicle comparable to a mobile telephone receiver that can receive signals from various, cells, towers, satellites, and the like.

The telecommunication device, or signal generator, as well as the signal receiver, may be digital or analogue, and will respond to commands presented by the user. For example, the system could be activated from any phone by calling a specified telephone number and entering an access code, similar to an answering machine. Such a system may also be used, for example, to start multiple systems simultaneously. Namely, an identical receiver may be provided in more than one machine, vehicle, or device. Similarly, it is contemplated that such a system may be used or linked with such systems currently used to program and operate common home link and other office systems, such as security systems, air conditioning, garage doors and lights.

As a result of the remote start, the big wheel motive power source 20, or even a conventional vehicle, can be started and "warmed-up" by the time the user reaches the vehicle 22, at which point the user can simply drive off. In connection with same, automotive accessories, such as air conditioning, a heater, mirror heaters, windshield defrost, and other devices may also be activated along with the vehicle power source by entering commands from the remote device. As a hypothetical example, with respect to industrial machinery, a worker may start the device from home, and by the time he or she reaches work, the machine or multiple machines will be warmed and ready for use, saving the employer money, as the employee will not need to spend time waiting for the engine to warm up.

Figure 5:
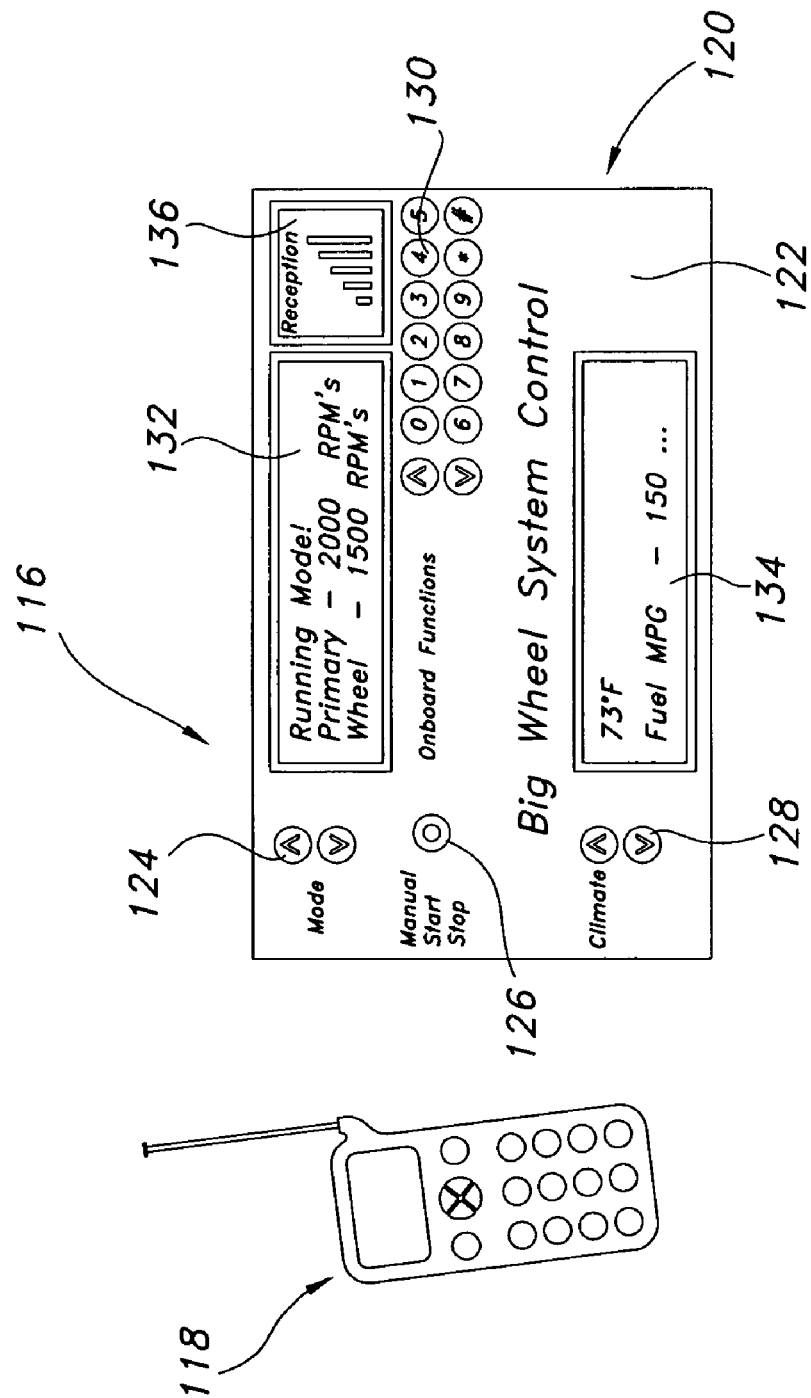
FIG. 5 shows a preferred embodiment of a control system for use with the big wheel motive power source of the present invention.

Referring to FIG. 5, the remote activated operation system 116 of the preferred embodiment is provided with a system control 120, such as an onboard computer operably connected to the vehicle 22. The onboard computer comprises a programmable central processing unit ("CPU") having a display 122 for communicating engine 34 and wheel 30 conditions to the user, for enabling user selection of particular settings, and for communicating these settings or translating the settings into operation of the big wheel motive power source 20. The display 122 and control system 120 are specifically provided for user interaction with the big wheel motive power source 20. The display 122 for the control system 120 is contemplated to be comparable to a current cellular telephone display, although comprises a slightly larger screen and different format variations and/or layout of menu items. Likewise, the display 122 also may incorporate user controls for changing the mode of operation 124 of the vehicle (described in further detail hereinbelow), provide a manual start and stop selection function 126 for starting and stopping the power source, a climate control 128 for maintaining the atmosphere of the vehicle, and other onboard function controls 130. Likewise, a display of user selections 132 and the performance of the vehicle 134 may also be provided. Finally, an antenna may be operably attached to the vehicle 22 (not shown) in a location sufficient to receive a signal from an outside source, similar to a cellular or mobile telephone 118 as described above. In connection with same, similar to a mobile phone, the control system may be equipped with a built-in phone receiver for receiving commands and/or signals from a remote location, and a reception display 136 on the system control 120.

The control system 120 may have several modes of operation. For example, the control 120 may provide a standby mode in which the big wheel motive power source 20 is off, and if available, a security system is on. A second mode may comprise a startup mode, in which one or more security alarms, if available, may be deactivated. In addition, in the startup mode, pre-operation function commands may also be received, such as climate control, mirror heaters, and the like. At the same time the engine startup sequence may occur, either by command or when the remote connection is terminated.

Following startup mode is an operational mode. A key may be used to unlock the doors (and deactivate any door alarms if available). The ignition may be turned on as well, which may unlock other features, such as a steering lock. If the remote system has already started the power source, the ignition will not re-start same, instead, operational mode will override the startup mode allowing the user direct control of the system. Further, in order to return to and/or activate the startup mode, the remote system could be re-used. For instance, in a telephone operated system, the requisite telephone number would be dialed, and an access code reentered.

A running mode follows the operational mode. As a non-limiting example, when the large mass, fast spinning wheel 30 reaches a preset speed, such as 16,000 rpm, the primary engine 34 may reduce its speed to a preset limit (i.e., 2,000 rpm). Likewise, during a running mode, when the rotation of the large mass wheel 30 falls to a lower preset speed, such as a speed of 12,000 or 13,000 rpm, the primary engine will increase its speed to a preset limit (i.e., 4,000 rpm) to accelerate the large mass wheel 30 rotation. This increase in speed of the engine 34 may be automatic, or by manual control with a throttle. Likewise, the specific engine and wheel speeds provided herein are by way of example only, and any speed acceptable for the purposes provided could be used without departing from the overall scope of the present invention.

A hypothetical example of an engine startup sequence is provided. The user dials an appropriate code to a phone to signal to the remote control system on board the vehicle. The vehicle subsequently starts. Once the engine 34 has started, the engine 34 runs at 1,500 rpm for one minute until warm and then increases speed to 4,000 rpm until the large mass wheel 30 reaches 16,000 rpm. Once the large mass, fast spinning wheel 30 has reached 16,000 rpm, the engine 34 reduces its speed to 2,000 rpm. However, the large mass wheel 30 remains at the higher rpm for some time, as it maintains its own speed by the inertia of the rotation of significant mass. The above sequence is provided merely as a representative example, and any timing, rpm, or preset conditions may be used to start the big wheel motive power source 20 of the present invention.

In addition to the above, within the running mode, the invention contemplates the use of preset operational control options within the system control 120, including but not limited to, town mode, highway mode, and manual mode. These modes may be controlled manually, or set and/or controlled through computer control from the programmable CPU. One of ordinary skill in the art will understand that the referenced mode titles are for illustrative purposes only and any designation for the specific purposes provided may be used without departing from the scope of the present invention.

Specifically, town mode comprises drawing back the throttle of the primary engine 34 when the RPMs of the engine 34 reach a designated or preset speed. As a non-limiting example, the large mass, rotating wheel 30 may reach 16,000 rpm. At that point, the control system 120, which is programmed to operate in town mode and has detected the preset revolution speed of the large mass wheel 30, will communicate with the primary engine 34 to reduce the speed of same. For example, the engine may be reduced to a speed of 2,000 rpm as mentioned above. The primary engine 34 would remain or continue operating at the lower RPM until the rotational speed of the large mass wheel 30 falls below a preset or designated rotational speed. Preferably, this speed would be 12,000 to 13,000 rpm. Upon reaching the lower speed, a signal would be sent to the primary engine 34 from the control system 120 to increase speed, and thereby increase the speed of rotation of the large mass wheel 30. In a preferred embodiment, the speed of the motor 34 would be returned to 4,000 rpm, and continue at such speed until the large mass wheel 30 reaches the preset limit of 16,000 rpm, but could increase to a speed of 20,000 rpm or more if more power is needed. In addition, in the town mode, the device contemplates that the vehicle 22 may become stationary, such as when parked or pausing at a stop light, yet the vehicle power system remains on. In such a situation, it is contemplated that the control system 120 reduces the primary engine 34 speed to a lower speed until movement of the vehicle 22 is required again. For example, it is contemplated that the speed of the primary engine 34 may be reduced to 1,500 rpm during an idling period. In this manner, the control system 120 effectively accounts for variances in speed and power requirements of the vehicle 22 and provides an efficient manner of maintaining the operation and rotation of the large mass wheel 30.

Alternatively, a highway mode is also contemplated. For instance, a vehicle 22 may be driven for an extended period of time at a single speed, or with limited variation in speed. In such a mode, a cruise control device may also be used. The present invention contemplates that when the large mass wheel 30 reaches a set speed in highway mode, such as between 16,000 rpm and 20,000 rpm, the primary engine will reduce its speed. For example, the primary engine may reduce its speed to 2,000 rpm. When the large mass wheel 30 loses speed, or slows to a preset speed, the engine 34 will increase speed so as to increase the rotational speed of the large mass wheel 30. As an illustrative example, the speed of the large mass wheel 30 may fall from 16,000 to 13,000 rpm. At 13,000 rpm, a signal is sent from the control system 120 to the primary engine 34 to increase speed to 4,000 rpm.

While two preset, computer controlled modes are discussed above, it is also contemplated that the control system 120 of the present invention may include, as an additional feature, or as a stand alone system, a manual mode of operation. In such a system, particularly when computer control modes are also available, the manual mode may override the other operational modes for purposes of safety. To assist in the operation of the power source when controlled manually, a hand throttle is provided to the user. The hand throttle is directly connected to the engine 34 and may be used to control the speed of rotation of the wheel. However, other means of control are also contemplated. Thus, the throttle control on the dash, or elsewhere accessible to the user, may be activated to increase the rotational speed of the large mass wheel 30, or to maintain the rotation of same (see FIG. 2). As the throttle is reduced to 1,500 rpm or less, the drive and/or engine 34 is generally disengaged from the large mass wheel 30. Specifically, if the throttle is fully reduced, it will not have enough momentum to drive the centrifugal clutch 38. As a result, drive from the input drive 103 will be discontinued, effectively disengaging the ratchet drive 52. Alternatively, if the throttle is reduced to a fast idle or "warm-up" speed (such as, but not limited to 1,500 rpm), the speed may be fast enough to turn the centrifugal clutch 38 driving into and warming up the transmission 40, but it will not have sufficient momentum to drive out of the transmission 40. In other words, shaft 42 and gear 44 remain stationary, effectively disengaging the ratchet drive 52. Of course, if the throttle is reduced to a lightweight cruising speed (including, but not limited to 2,000 rpm), one of the overdrives of the transmission 40 may be employed, continuing the rotation of the large mass wheel 30 at the desired operational speed (such as, but not limited to 12,000 to 16,000 rpm). When the drive and/or engine is disengaged from the large mass wheel 30, energy may be discipated from the large mass wheel 30 over time, through motivation of the vehicle, or even various breaking systems. The movement of the throttle by the user will also cause a sensor to alert the system control 120 of the selection of manual control, and manual operational mode will take effect, overriding all other operational modes.

Finally, a lockdown mode is also contemplated for use with the control system 120 of the present invention. Namely, a code may be entered into the computer which results in ignition shut down and alarm activation. In this manner, the vehicle can be secured against theft. Likewise, lockdown mode can also be activated in the case of the vehicle already having been stolen to shut and/or lock the vehicle down. This mode overrides manual and/or automatic operation of the vehicle 22 to avoid theft of the vehicle 22. Likewise, a common security system may be added to the device.

In general, the rotational speeds of the engine 34 and large mass wheel 30 are listed hereinabove for purposes of example only, and any speed effective for the purposes provided would be acceptable for purposes of the present invention.

As a preliminary startup period for the big wheel motive power source 20 is contemplated, a small amount of exhaust emission may be generated, particularly in the event an internal combustion engine is used as the small horsepower engine 34. To avoid the accumulation of exhaust fumes in an enclosed space, such as a garage or other structure, a turbine exhaust extractor 138 may be used in combination with the present system. While exhaust extractors are available today, such systems typically involve the use of a fan which withdraws fumes from the respective enclosed chamber.

Figure 6:
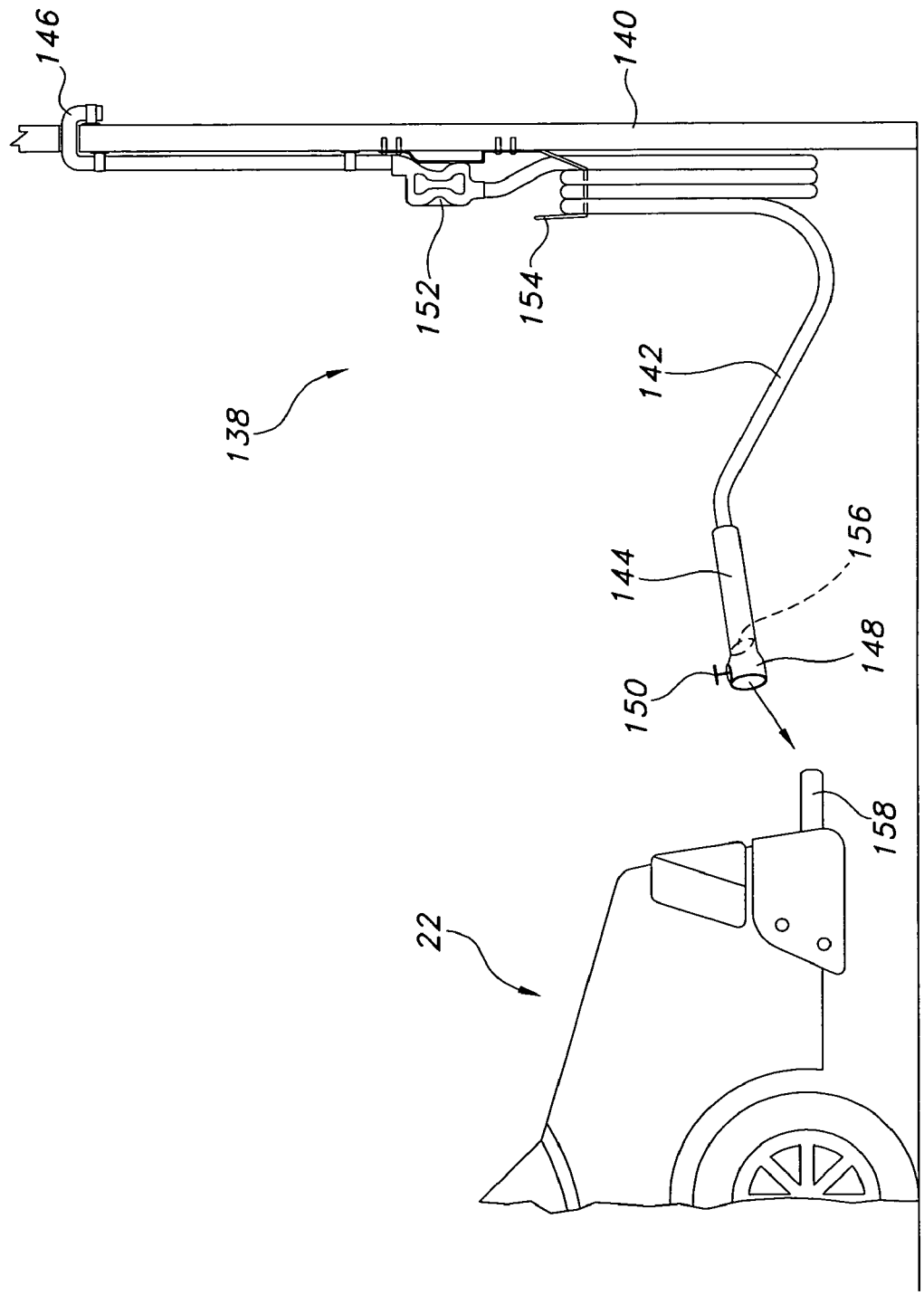
FIG. 6 shows a preferred embodiment of an exhaust extraction system for use with the big wheel motive power source of the present invention.

In comparison, the turbine exhaust extractor 138 of the present invention (see FIG. 6) is preferably for use in an enclosed space attaching directly to the vehicle exhaust pipe 158. In the preferred embodiment, a wall 140 of the garage, the floor, or the ceiling, is provided with a bracket 154 for holding or supporting an exhaust extraction device. One or more of a turbine 152, a hose 142, or a hook 154 are connected to the wall 140, ceiling, floor, or other location in or near the enclosed space. The exhaust extraction device comprises a hose 142 having an engagement means 144 on one end, and a means of exhausting the fumes 146 to the outside of the enclosed space on the opposite end. In the preferred embodiment, the engagement means 144 is a receptor 148 having an enlarged exhaust pipe receiving end, and composed of material sufficient to withstand the heat of the exhaust pipe, fitting over a vehicle exhaust pipe 158. The receptor 148 further includes a tightening means 150, such as a T-bolt, for securing the receptor 148 in place on the exhaust pipe 158. The tightening means 150 may also comprise an adjustment for different sized exhaust pipes 158 such as a variable diameter loop. However, any means of tightening the engagement means 144 to the exhaust pipe 158 of the vehicle 22, or for securely fastening a wider cylindrical pipe to a narrower cylindrical pipe, would be acceptable for purposes of the present invention. In addition to a tightening device 150, the engagement means 144 may be provided with a one-way flap or valve 156 to prevent fumes from back-flowing or leaking into the enclosed space.

For exhausting fumes generated by the vehicle 22, a turbine exhaust extractor 152 is operably connected to the hose 142 along a portion thereof. The turbine 152 is driven by pressure from the exhaust generated by the vehicle 22. As the turbine 152 is activated, it draws exhaust generated by the vehicle 22 through the engagement means 144, through the hose 142, and out the exhaust port 146 to the outside, thereby exhausting the fumes generated by the vehicle 22 outside of the enclosed space. It is contemplated that the exhaust extractor may also be powered on from a remote activation system or manually as a direct result of starting the engine.

While the turbine exhaust extractor 152 is disclosed for use with the big wheel motive power source 20, other vehicles and devices would also benefit from the use of same, including, but not limited to conventional vehicles. Likewise, mechanics, and others who work on vehicles and machines generating noxious fumes in enclosed spaces may also benefit from the device.

Figure 7:
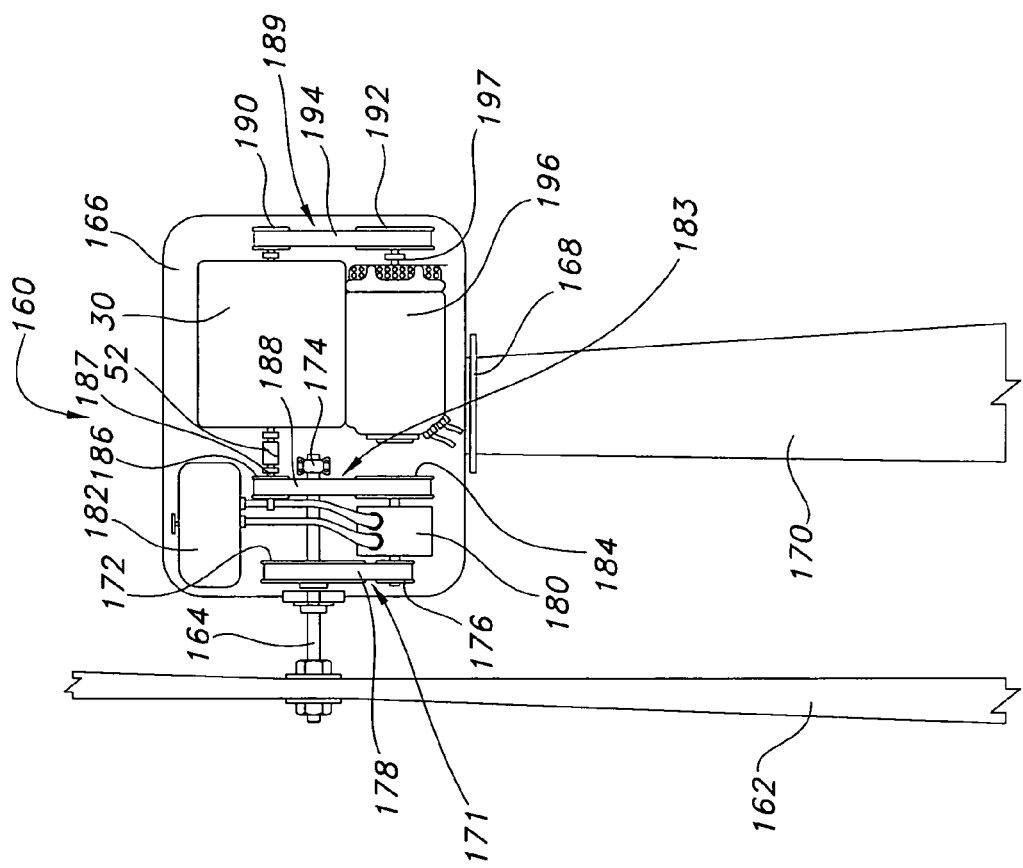
FIG. 7 shows an alternative embodiment of the big wheel motive power source for use in a windmill.

While a big wheel motive power source 20 has been described above for use in a vehicle 22, the invention is not limited thereto. One of ordinary skill in the art would understand numerous applications of the power source are possible. For instance, FIG. 7 demonstrates an alternative embodiment of the big wheel motive power source of the present invention. Namely, the big wheel motive power source 20 may be used in connection with a windmill or wind turbine 160.

As is known, wind or wind bursts will cause the rotation of the windmill 160. The rotation of the windmill, in turn, rotates the large mass wheel 30. Due to the inertia of the rotating wheel, in the lull between wind bursts, the large mass wheel 30 continues to rotate and generate power. Likewise, a windmill 160 containing the big wheel motive power source 20 may drive a generator 196.

In detail, the windmill 160, as is common in the art, comprises a large rotor 162 for operation with the assistance of wind. The rotor 162 is connected to a central axle 164 which extends into a housing 166. The housing 166 itself is on a swivel base 168 attached to a post 170 extending vertically upward from the ground (not shown). Within the housing 166 is the big wheel motive power source. Namely, the axle 164 extends through a first gear wheel/pulley 172 driving into a bearing 174. The first drive 171 is geared up to a transmission 180 through a second pulley 176 and belt 178 at a ratio of 12:1. The automatic transmission 180, as provided herein, is a 12 speed automatic transmission operatively linked to a synthetic oil reservoir 182.

A second drive 183 is also provided between the transmission 180 and the big wheel 30. Namely a third gear wheel or pulley 184 is linked by a belt 188 to a fourth gear wheel 186 operatively attached to a shaft 187 driving the large mass wheel 30. This drive is geared up at a ratio of 4:1 between the transmission 180 and the large mass wheel 30. In addition, the shaft 187 driving the large mass wheel 30 may include a ratchet-type drive 52, as discussed previously hereinabove.

The large mass wheel 30 is further connected to a generator 196. Energy is stored through the rotation of the large mass wheel 30 caused by a third drive 189. Specifically, the third drive 189 includes a fifth gear wheel 190 which is operably linked to a sixth gear wheel 192 by a belt 194. The drive from the big wheel 30 to the generator 196 is geared down at a ratio of 1:4. The sixth pulley 192 is driven into the generator 196 by shaft 197. In this manner, the rotation of the large mass wheel 30 causes the build up of energy. In the lull between wind gusts, the rotor 162 stops turning, the ratchet drive 52 may be disengaged, allowing the large mass wheel 30 to free-spin, thereby providing a continuous energy source to keep the generator 196 rotating. The rotation of the generator 196 generates power.

As can be seen from the above, contrary to current systems available today, the big wheel motive power source of the present invention requires only twenty percent (20%) of the fuel required to run a conventional engine for the same size vehicle. This translates into twenty percent (20%) of the fuel input and twenty percent (20%) of the exhaust. Such a system provides an attractive addition to currently available renewable energy sources, such as electric power, as it provides a more efficient means of generating a large amount of power with minimal power input. In fact, with the correct gearing between the engine, large mass wheel, and the drive train, the energy input to motivate the large mass wheel is marginal compared with the energy required to run a conventional engine. As a non-limiting, simple, hypothetical example to illustrate that point, in order to gain 100 horsepower from the output of the big wheel, the input would be a maximum of twenty horsepower from a small internal combustion or renewable fuel driven engine. This equates to 20% input for 100% output. Significant advantages are available as a result, most significantly a consumer's expenses and the exhaust emissions generated by the machine, vehicle, or device are reduced by nearly 80%.

As demonstrated herein, the big wheel motive power source disclosed can be used in numerous machines, vehicles and devices, such as wheeled vehicles and wind turbines. Attractive, efficient applications of the big wheel motive power source also include track driven vehicles, city shuttles, busses, taxis, and other vehicles in which a large portion of the day consists of idling. Alternatively, the big wheel motive power source finds attractive uses in industrial and heavy machinery wherein counterweights are used, such as steamrollers, wheel loaders, forklifts, and the like. Such machinery often includes significant added weight as a counterweight for purposes of keeping same upright. The large mass wheel 30 would provide the effective counterweight, while avoiding the need to add additional weight to the device. The big wheel motive power source, alternatively, may be used in a boat or ship. Namely, one third the power would be needed to generate twice the horsepower for the ship engine. Furthermore, ships use ballast, so the added weight of one or more heavy wheels would not be an issue. Such a system could triple the range of any watercraft. Alternatively, the big wheel motive power source may be used in certain propeller driven airplanes. Stationary applications are also contemplated, such as compressors, log haulers, generators, and other machines in which a large percentage of time the engine runs, but the power is not used. Finally, the big wheel motive power source is contemplated for use in any vehicle, machine, and/or device in which frequent or long idling, or slack periods exist.

The various mechanisms for the big wheel motive power source disclosed herein may be combined in numerous combinations, and the invention should not be limited to the particular combinations described and illustrated herein. For example, it is contemplated that any kind or size of engine may be used to power the rotation of the large mass wheel 30 without departing from the scope of the present invention. Likewise, it would be obvious to modify the large mass wheel 30 to any size and/or weight. Additionally, one wheel may be used, or multiple wheels may be used without departing from the scope of the present invention.

Likewise, as indicated above, the big wheel motive power source 20 may also be used in a rear wheel drive or four wheel drive vehicle. In such instances, the vehicle may also comprise a hydraulic pump having hose connections to a hydraulic motor at the rear of the vehicle. Namely, the hydraulic motor would drive into a rear transmission and differential setup. Moreover, in a rear wheel drive vehicle with a traditional gearbox or transmission, the driveshaft may be shorter and the gearbox may sit back further to allow access behind the heavy wheel. Conversely, in an alternative system, such as a bus, multiple mid-mounted large mass wheels may be provided to accomplish the desired function.

Presently preferred embodiments of the present invention and many of its improvements have been described with a degree of particularity. The previous description is of preferred examples for implementing the invention, and the scope of the invention should not necessarily be limited by this description.

What is claimed is:

1. A big wheel motive power source comprising:
    a wheel capable of rotation and having a weight comprising at least one of at least one-third the weight of a vehicle in which it is located or at least twice the weight of a conventional engine for said vehicle;
    a small horsepower, continuously running engine operably connected to said wheel for generating the rotation of said wheel;
    at least one driven wheel operably attached to said wheel, wherein said wheel rotation provides a primary motive power source for said driven wheel of said vehicle; and
    at least one of a transmission and a ratchet-drive operably connected between said small horsepower engine and said wheel, wherein said transmission comprises an automatic transmission having a plurality of speeds.

2. The big wheel motive power source of claim 1, further comprising a centrifugal clutch.

3. The big wheel motive power source of claim 1, further comprising an oil bath bearing.

4. The big wheel motive power source of claim 1, further comprising a gear system having a first pulley operably linked to a second pulley, said gear ratio between said first pulley and said second pulley comprising a geared up ratio of 4:1.

5. The big wheel motive power source of claim 1, wherein said small horsepower engine comprises a throttle.

6. The big wheel motive power source of claim 1, wherein said small horsepower engine further comprises an internal combustion engine.

7. The big wheel motive power source of claim 1, wherein said small horsepower engine further comprises a renewable fuel engine.

8. The big wheel motive power source of claim 7, wherein said renewable fuel engine comprises an electric engine.

9. The big wheel motive power source of claim 1, further comprising at least one of a low friction bearing, a clutch, a gear system, and a gearbox and differential operably connected between said wheel and said driven wheel.

10. The big wheel motive power source of claim 9, wherein said low friction bearing comprises an oil bath bearing.

11. The big wheel motive power source of claim 9, wherein said gear system comprises a first pulley operatively linked to a second pulley, said gear ratio between said first pulley and said second pulley comprising a geared down ratio of 1:5.

12. The big wheel motive power source of claim 9, wherein said gearbox and differential comprise a gearbox and differential for a front wheel drive vehicle.

13. The big wheel motive power source of claim 1, wherein said wheel is enclosed within a housing.

14. A big wheel motive power source comprising:
    a wheel capable of rotation and having a weight comprising at least one of at least one-third the weight of a vehicle in which it is located or at least twice the weight of a conventional engine for said vehicle;
    a small horsepower, continuously running engine operably connected to said wheel for generating the rotation of said wheel;
    at least one driven wheel operably attached to said wheel, wherein said wheel rotation provides a primary motive power source for said driven wheel of said vehicle; and
    at least one of a transmission and a ratchet-drive operably connected between said small horsepower engine and said wheel, wherein said ratchet-drive comprises a worm engaged, ratchet-type drive.

15. The big wheel motive power source of claim 14, further comprising a centrifugal clutch.

16. The big wheel motive power source of claim 14, further comprising an oil bath bearing.

17. The big wheel motive power source of claim 14, further comprising a gear system having a first pulley operably linked to a second pulley, said gear ratio between said first pulley and said second pulley comprising a geared up ratio of 4:1.

18. The big wheel motive power source of claim 14, wherein said small horsepower engine comprises a throttle.

19. The big wheel motive power source of claim 14, wherein said small horsepower engine further comprises an internal combustion engine.

20. The big wheel motive power source of claim 14, wherein said small horsepower engine further comprises a renewable fuel engine.

21. The big wheel motive power source of claim 20, wherein said renewable fuel engine comprises an electric engine.

22. The big wheel motive power source of claim 14, further comprising at least one of a low friction bearing, a clutch, a gear system, and a gearbox and differential operably connected between said wheel and said driven wheel.

23. The big wheel motive power source of claim 22, wherein said low friction bearing comprises an oil bath bearing.

24. The big wheel motive power source of claim 22, wherein said gear system comprises a first pulley operatively linked to a second pulley, said gear ratio between said first pulley and said second pulley comprising a geared down ratio of 1:5.

25. The big wheel motive power source of claim 22, wherein said gearbox and differential comprise a gearbox and differential for a front wheel drive vehicle.

26. The big wheel motive power source of claim 14, wherein said wheel is enclosed within a housing.

27. A big wheel motive power source comprising:
    a wheel capable of rotation and having a weight comprising at least one of at least one-third the weight of a vehicle in which it is located or at least twice the weight of a conventional engine for said vehicle;
    a small horsepower, continuously running engine operably connected to said wheel for generating the rotation of said wheel;
    at least one driven wheel operably attached to said wheel, wherein said wheel rotation provides a primary motive power source for said driven wheel of said vehicle; and
    a slip clutch operably connected between said wheel and said driven wheel.

28. The big wheel motive power source of claim 27, wherein said slip clutch is operably connected to a vehicle accelerator.

29. The big wheel motive power source of claim 27, further comprising an oil bath bearing.

30. The big wheel motive power source of claim 27, further comprising a gear system having a first pulley operably linked to a second pulley, said gear ratio between said first pulley and said second pulley comprising a geared up ratio of 4:1.

31. The big wheel motive power source of claim 27, wherein said small horsepower engine comprises a throttle.

32. The big wheel motive power source of claim 27, wherein said small horsepower engine further comprises an internal combustion engine.

33. The big wheel motive power source of claim 27, wherein said small horsepower engine further comprises a renewable fuel engine.

34. The big wheel motive power source of claim 33, wherein said renewable fuel engine comprises an electric engine.

35. The big wheel motive power source of claim 27, further comprising at least one of a low friction bearing, a clutch, a gear system, and a gearbox and differential operably connected between said wheel and said driven wheel.

36. The big wheel motive power source of claim 35, wherein said low friction bearing comprises an oil bath bearing.

37. The big wheel motive power source of claim 35, wherein said gear system comprises a first pulley operatively linked to a second pulley, said gear ratio between said first pulley and said second pulley comprising a geared down ratio of 1:5.

38. The big wheel motive power source of claim 35, wherein said gearbox and differential comprise a gearbox and differential for a front wheel drive vehicle.

39. The big wheel motive power source of claim 27, wherein said wheel is enclosed within a housing.

* * * * *